United States Patent
Henze et al.

(10) Patent No.: US 12,492,282 B2
(45) Date of Patent: Dec. 9, 2025

(54) BUSBAR, AT LEAST PARTLY COVERED WITH A THERMOPLASTIC POLYURETHANE COMPOSITION

(71) Applicant: BASF SE, Ludwigshafen Am Rhein (DE)

(72) Inventors: Oliver Steffen Henze, Lemfoerde (DE); Denis Bouvier, Mitry-Mory (FR)

(73) Assignee: BASF SE, Ludwigshafen am Rhein (DE)

( * ) Notice: Subject to any disclaimer, the term of this patent is extended or adjusted under 35 U.S.C. 154(b) by 0 days.

(21) Appl. No.: 18/294,361

(22) PCT Filed: Jul. 27, 2022

(86) PCT No.: PCT/EP2022/071039
§ 371 (c)(1),
(2) Date: Feb. 1, 2024

(87) PCT Pub. No.: WO2023/012002
PCT Pub. Date: Feb. 9, 2023

(65) Prior Publication Data
US 2024/0270894 A1    Aug. 15, 2024

(30) Foreign Application Priority Data

Aug. 3, 2021    (EP) .................................. 21189432

(51) Int. Cl.
*C08G 18/48*    (2006.01)
*C08G 18/32*    (2006.01)
(Continued)

(52) U.S. Cl.
CPC ..... *C08G 18/4854* (2013.01); *C08G 18/3206* (2013.01); *C08G 18/6674* (2013.01);
(Continued)

(58) Field of Classification Search
CPC ............ C08G 18/4854; C08G 18/3206; C08G 18/6674; C08G 18/7671; C08K 5/34924; C08K 7/14; H01B 7/295
(Continued)

(56) References Cited

U.S. PATENT DOCUMENTS 4,347,334 A  8/1982 Staendeke et al.
4,467,056 A  8/1984 Staendeke et al.
(Continued)

FOREIGN PATENT DOCUMENTS

CN    101847506 A    9/2010
CN    106029722 A    10/2016
(Continued)

OTHER PUBLICATIONS

Machine translation of CN 106905686 A (Year: 2017).*
(Continued)

*Primary Examiner* — Callie E Shosho
*Assistant Examiner* — Steven A Rice
(74) *Attorney, Agent, or Firm* — Grüneberg and Myers PLLC (57) ABSTRACT

A busbar can be at least partly covered with composition, where the composition has a thermoplastic polyurethane, a flame retardant, and a filler. The thermoplastic polyurethane is a reaction product of a diisocyanate, a polyol, and a chain extender. The polyol can be a polyetherpolyol or a diol. The polyetherpolyol can also be polytetrahydrofuran (PTHF).

12 Claims, 3 Drawing Sheets

(51) Int. Cl.
*C08G 18/66* (2006.01)
*C08G 18/76* (2006.01)
*C08K 5/3492* (2006.01)
*C08K 7/14* (2006.01)
*H01B 7/295* (2006.01)

(52) U.S. Cl.
CPC ...... *C08G 18/7671* (2013.01); *C08K 5/34924* (2013.01); *C08K 7/14* (2013.01); *H01B 7/295* (2013.01)

(58) Field of Classification Search
USPC ...................................................... 428/423.1
See application file for complete search history.

(56) References Cited

U.S. PATENT DOCUMENTS

| | | | |
|---|---|---|---|
| 4,514,328 | A | 4/1985 | Staendeke et al. |
| 4,639,331 | A | 1/1987 | Elsner et al. |
| 5,579,217 | A | 11/1996 | Deam et al. |
| 10,047,214 | B2 * | 8/2018 | Henze ................. C08G 18/6674 |
| 10,815,376 | B2 * | 10/2020 | Henze ..................... C08L 75/04 |
| 11,851,523 | B2 * | 12/2023 | Henze ................. C08G 18/4213 |
| 12,060,450 | B2 * | 8/2024 | Roy ..................... C08G 18/7671 |
| 2013/0330468 | A1 * | 12/2013 | Makadia ................. C08L 75/04 524/451 |
| 2017/0002199 | A1 * | 1/2017 | Henze ..................... C08G 18/44 |
| 2017/0066906 | A1 | 3/2017 | Henze et al. |
| 2018/0334116 | A1 | 11/2018 | Sanvito et al. |
| 2021/0163714 | A1 * | 6/2021 | Henze ...................... C08K 7/14 |
| 2021/0189100 | A1 | 6/2021 | Henze et al. |

FOREIGN PATENT DOCUMENTS

| | | | | |
|---|---|---|---|---|
| CN | 106029726 | A | | 10/2016 |
| CN | 106751744 | A * | | 5/2017 |
| CN | 106905686 | A * | | 6/2017 | ............. C08K 13/04 |
| CN | 108026328 | A | | 5/2018 |
| CN | 109251655 | A * | 1/2019 | ........... C09D 175/08 |
| CN | 110291126 | A | | 9/2019 |
| CN | 111406082 | A | | 7/2020 |
| CN | 112424250 | A | | 2/2021 |
| EP | 0617079 | A2 | | 9/1994 |
| EP | 3110882 | | | 1/2017 |
| EP | 3 447 775 | | | 2/2019 |
| GB | 1 330 512 | | | 9/1973 |
| JP | 2008-167571 | A | | 7/2008 |
| JP | 2013-518147 | A | | 5/2013 |
| JP | 2016-085822 | A | | 5/2016 |
| WO | WO-2012/174712 | A1 | | 12/2012 |
| WO | 2015/128213 | | | 9/2015 |
| WO | WO-2017079101 | A1 * | 5/2017 | ........... B29C 48/022 |
| WO | 2020/002200 | | | 1/2020 |

OTHER PUBLICATIONS

Machine translation of CN 109251655 A (Year: 2019).*
Machine translation of CN 106751744 A (Year: 2017).*
Gallagher, "Thermoset Urethane vs. Thermoplastic Urethane", Sep. 19, 2020, at https://gallaghercorp.com/thermoset-urethane-vs-thermoplastic-urethane/, archived at https://web.archive.org/web/20250000000000*/https://gallaghercorp.com/thermoset-urethane-vs-thermoplastic-urethane/ (Year: 2020).*
International Search Report received for PCT Application No. PCT/EP2022/071039, mailed on Oct. 24, 2022, 3 pages.
Written Opinion received for PCT Application No. PCT/EP2022/071039, mailed on Oct. 24, 2022, 4 pages.
"Chemical Structures, CAS—Numbers, Producers and Tradenames of Stabilizers", Plastics Additives Handbook, ed. Dr. Zweifel, et al., 5th Edition, Jan. 1, 2001, pp. 98-136.
European Search Report for EP Patent Application No. 21189432.4, Issued on Jan. 25, 2022, 3 pages.
International Preliminary Report on Patentability for PCT Patent Application No. PCT/EP2022/071039, Issued on Feb. 15, 2024, 6 pages.

* cited by examiner

FIG.3

BUSBAR, AT LEAST PARTLY COVERED WITH A THERMOPLASTIC POLYURETHANE COMPOSITION

CROSS-REFERENCE TO RELATED APPLICATIONS

This application is a National Stage entry under § 371 of International Application No. PCT/EP2022/071039, filed on Jul. 27, 2022, and which claims the benefit of priority to European Patent Application No. 21189432.4, filed on Aug. 3, 2021. The content of each of these applications is hereby incorporated by reference in its entirety.

The current invention is directed to an over-moulded solid metallic conductor, also referred to as busbar covered at least partly with a thermoplastic polyurethane composition.

Busbars are generally uninsulated, self-supporting and have sufficient distance from one another to ensure electrical insulation.

Although busbars generally are uninsulated, in the e-mobility assembly personnel must be protected from touching voltage-carrying components. Therefore, different approaches how to cover busbars are under test, as mentioned e.g. in US 2018/334116 A1 or U.S. Pat. No. 5,579,217A1.

Flame retardant thermoplastic polyurethanes mainly for application in cable are well known, see e.g. EP3110882 A1, or EP 0617079 A2.

The requirements are high insulation capacity to minimize the space between a plurality of busbars. The coverage shall avoid moisture and dirt to creep between the coverage and the busbar and shall be flame retardant. At the same time there is the requirement, that the cover is stable enough to allow mechanical fastening of the busbar to another device and stability shall persist even under extreme temperature change without showing cracking or shrinkage, e.g. from icy winter temperature up to temperatures well beyond 100 degrees and higher which immediately come up, when high power is applied to the busbar. Also, in these stress situations the characteristic of the polymer should not change, and the extension of the polymer should not go much beyond the extension of the electronic conductor to avoid corrosion between these two materials. At the same time the coverage should fulfill additional requirements, such as damping and decoupling of vibration.

Surprisingly these requirements were fulfilled with a busbar at least partly covered with a thermoplastic polyurethane composition according to claim 1.

FIGURES

FIGS. 1 to 3 show the busbar (1) used for testing in the Examples.

DETAILED DESCRIPTION

Figure 1:
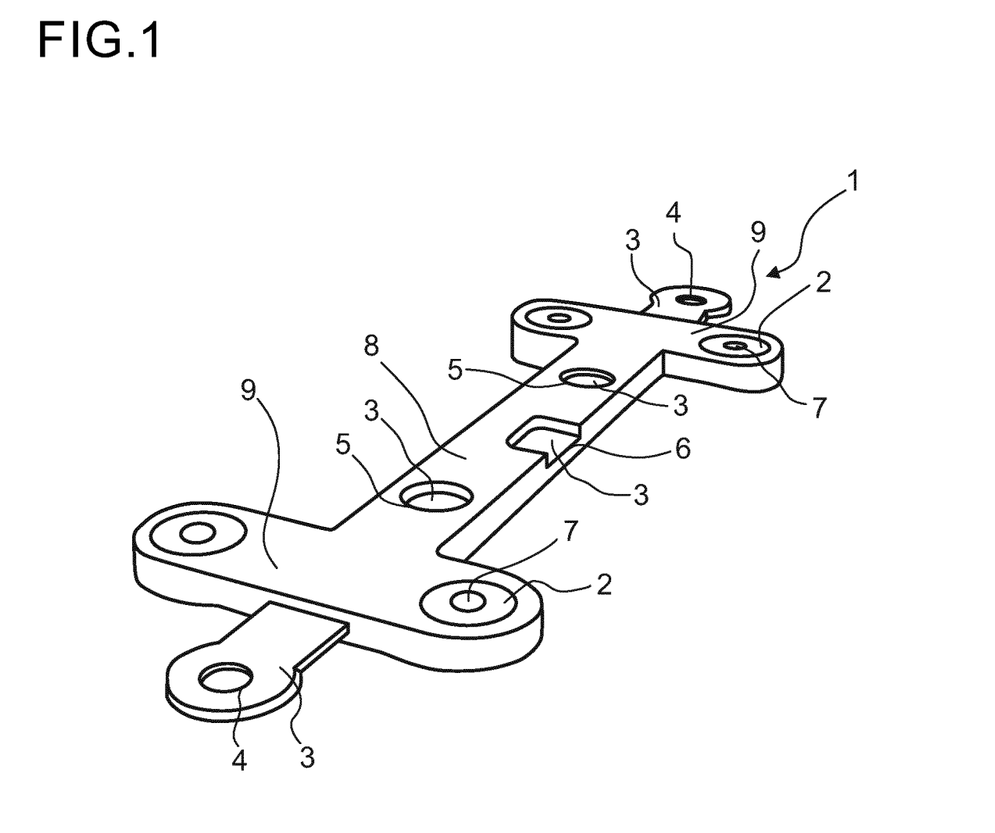
FIG. 1 shows a 3 D view from above of the busbar (1) with a copper conductor coated with a lead pewter alloy, partly jacketed with the composition (8) according to the invention. The conductor (3) has two ends for connecting with holes (4). The jacket of the composition (8) has two round notches (5) and one rectangular notch on the top (6) down to the conductor (3). The busbar comprises two crossbars (9) with cylindrical mounting bolts (2) comprising a hole (7).
Figure 2:
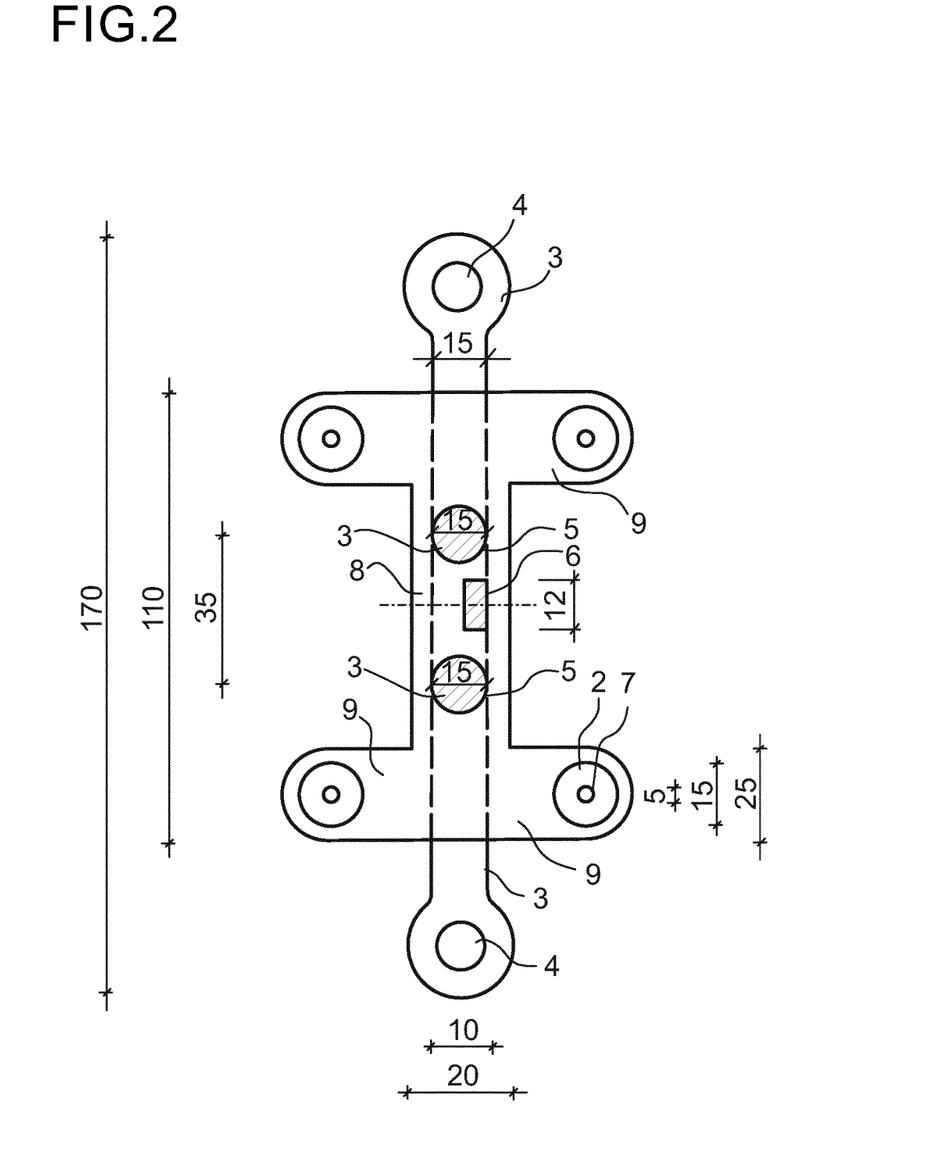
FIG. 2 shows the conductor from the top, FIG. 3 from the side. Both figures give the measures in mm.
Figure 3:
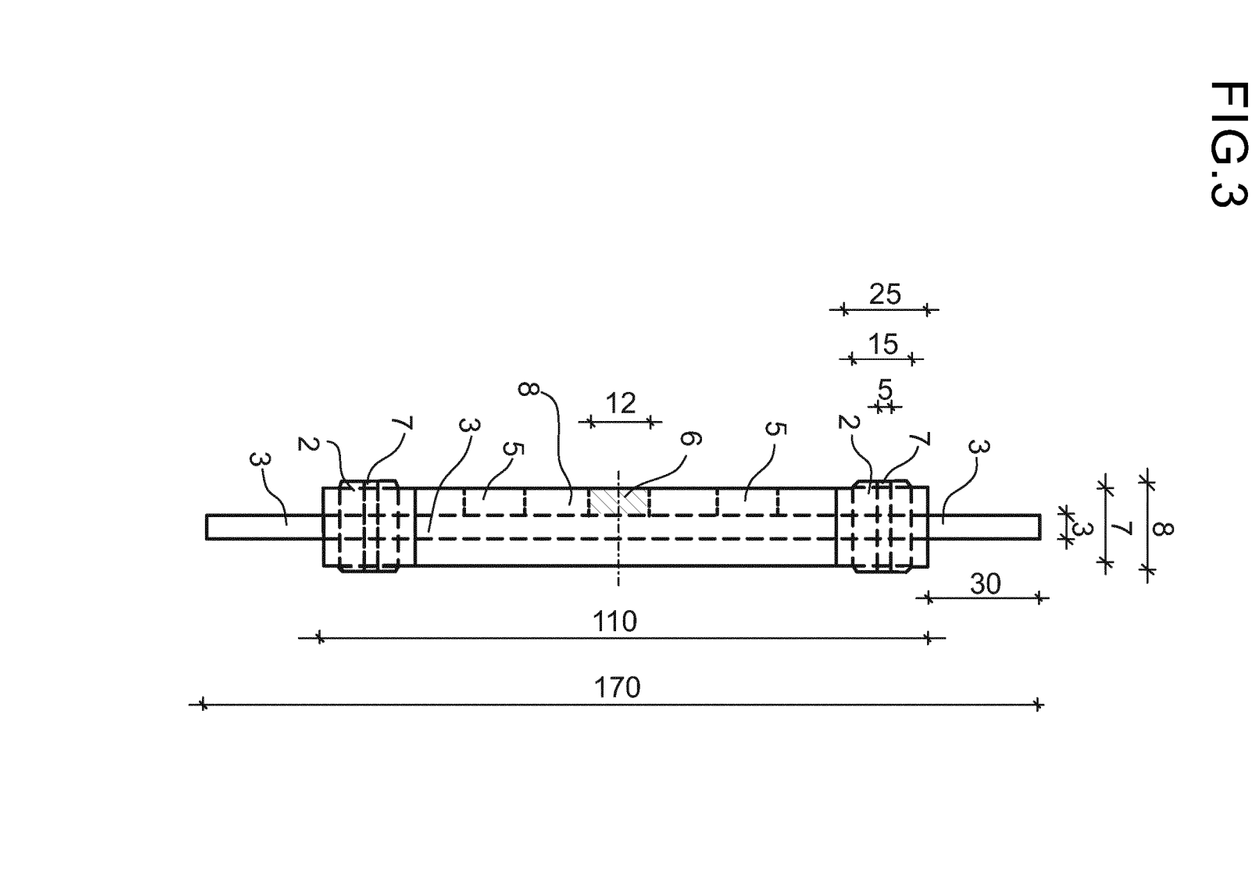

A first aspect of this invention and embodiment 1 is a busbar at least partly covered with a composition comprising thermoplastic polyurethane, flame retardant and filler, wherein the thermoplastic polyurethane is the reaction product of a diisocyanate, a polyol, preferably a polyol diol, and a chain extender.

A busbar is a metallic strip or bar, usually within a housing for local high current power distribution. The main functions of the busbar are the safe, short-circuit-free conduction of electrical energy, preferably between the power storage, the engine, and the charging components.

The advantages to use busbars instead of power cords are avoiding tangled cables, easy installation, minimized use of materials, reduction of weight and lower inductivity. A huge advantage of using thermoplastic polyurethane for coverage of busbars is low tendency to fracture at the welding lines. Welding lines refer to the meeting point of two melting furnaces, which occurs when filling complex injection molds, such as used for busbars. Thermoplastic polyurethane further shows low tendency to crack event at temperatures wide below 0 degrees Celsius.

The term composition indicates that the composition does not comprise the thermoplastic polyurethane only, but may comprise other polymers as well as, same as additives and/or auxiliaries. In a preferred embodiment, the composition comprises the thermoplastic polyurethane as described below, without any further polymer.

Preferably the thermoplastic polyurethane, is prepared by reacting an diisocyanate, with a polyol, preferably having two hydroxyl groups reactive with isocyanate, preferably having a number average molecular weight of from $0.5 \times 10^3$ g/mol to $10 \times 10^3$ g/mol and, if desired, a chain extender preferably having a molecular weight of from $0.05 \times 10^3$ g/mol to $0.499 \times 10^3$ g/mol, if desired in the presence of a catalyst and/or an auxiliary and/or an additive.

The components diisocyanate, polyol, and chain extender are also addressed individually or together as structural components. The structural components including the catalyst and/or the auxiliary and/or the additive are also called input materials.

In order to adjust the hardness and melt index of the thermoplastic polyurethane (TPU), the molar ratios of the quantities of the structural components and the chain extender, and, if used, water, can be varied, whereby the hardness and melt viscosity increase with increasing content of chain extender, while the melt flow index decreases.

In a preferred embodiment the Shore hardness of the composition is 65 Shore D to 100 Shore D, preferably measured according to DIN ISO 7619-1: 2016, more preferably 65 Shore D to 85 Shore D. Preferably the thermoplastic polyurethane comprised in the composition has a Shore hardness of 75 Shore A to 85 Shore D, preferably measured according to DIN ISO 7619-1, 2016, preferably 95 Shore A to 75 Shore D, more preferably 60 Shore D to Shore 70 Shore D.

In order to prepare the thermoplastic polyurethane, the structural components diisocyanate, polyol, and the chain extender, are reacted preferred in embodiments in the presence of a catalyst, and optionally auxiliaries and/or additives in such quantities that the equivalent ratio of NCO groups of the diisocyanates to the sum of the hydroxyl groups of the polyol and the chain extender is 0.95 to 1.10:1, preferably 0.98 to 1.08:1 and in particular approximately 1.0 to 1.05:1.

The thermoplastic polyurethane in a granulate from the composition preferably has a weight-average molecular weight of between $0.03 \times 10^6$ g/mol and $1.5 \times 10^6$ g/mol, preferably between $0.04 \times 10^6$ g/mol and $1.2 \times 10^6$ g/mol, more preferably between $0.05 \times 10^6$ g/mol and $0.08 \times 10^6$ g/mol. The thermoplastic polyurethane in the busbar preferably has a weight-average molecular weight of between $0.03 \times 10^6$ g/mol and $1.2 \times 10^6$ g/mol, preferably between $0.04 \times 10^6$ g/mol and $1.2 \times 10^6$ g/mol, more preferably between $0.04 \times 10^6$ g/mol and $0.07 \times 10^8$ g/mol. The weight average molecular weight (Mw) preferably is measured according to DIN 55672-2 2016-03.

The molecular weight refers to the number average molecular weight (Mn) in the context of this invention, if not indicated differently, and is determined by gel permeation chromatography, preferably it is determined according to DIN 55672-1 2016-03.

Isocyanate

The diisocyanate preferably is selected from the group consisting of aliphatic, cycloaliphatic, araliphatic and aromatic isocyanates, or is a mixture thereof. The isocyanate more preferably is selected from the group comprising tri-, tetra-, penta-, hexa-, hepta- and/or octamethylene diisocyanate, 2-methyl-pentamethylene 1,5-diisocyanate, 2-ethyl-butylene-1,4-diisocyanate, 1,5-pentamethylene diisocyanate (PDI), 1,4-butylene-diisocyanate, 1-isocyanato-3,3,5-trimethyl-5-isocyanatomethyl-cyclohexane (isophorone diisocyanate, IPDI), 1,4-bis(isocyanatomethyl)cyclohexane and/or 1,3-bis(isocyanatomethyl)cyclohexane (HXDI), 2,4-praraphenylene diisocyanate (PPDI), 2,4-tetramethylene xylene diisocyanate (TMXDI), 4,4'-, 2,4'- and 2,2'-dicyclohexylmethane diisocyanate (H12 MDI), 1,6-hexamethylene diisocyanate (HDI), 1,4-cyclohexane diisocyanate, 1-methyl-2,4- and/or -2,6-cyclohexane diisocyanate, 2,2'-, 2,4'- and/or 4,4'-diphenylmethane diisocyanate (MDI), 1,5-naphthylene diisocyanate (NDI), 2,4- and/or 2,6-toluene diisocyanate (TDI), 3,3'-dimethyl-diphenyl diisocyanate, 1,2-diphenylethane diisocyanate and/or phenylene diisocyanate, or is a mixture thereof.

Aliphatic isocyanates are preferred when stability against electromagnetic waves e.g. light is of importance, whereas aromatic polyisocyanate is preferred when high mechanical strength of the thermoplastic polyurethane is required. A further advantage of aliphatic isocyanate is that it may be produced bio-based.

A very preferred aromatic isocyanate is 2,2'-, 2,4'- and/or 4,4'-diphenylmethane diisocyanate (MDI), especially preferred is 4,4'-diphenylmethane diisocyanate.

A very preferred aliphatic isocyanate is 1,5-pentamethylene diisocyanate. This has the additional advantage, that it can be produced bio based.

Polyol

The polyol has on statistical average at least 1.8 and at most 3.0 Zerewitinoff-active hydrogen atoms. This number is also referred to as the functionality of the isocyanate-reactive compound (b) and indicates the quantity of the isocyanate-reactive groups of the molecule calculated theoretically down to one molecule from a quantity of substance. The functionality is preferred between 1.8 and 2.6, further preferred between 1.9 and 2.2 and especially preferred 2. Compounds (b) reactive with isocyanates are preferably those having a molecular weight between 0.500 g/mol and $8 \times 10^3$ g/mol, preferably $0.7 \times 10^3$ g/mol to $6.0 \times 10^3$ g/mol, in particular $0.8 \times 10^3$ g/mol to $4.0 \times 10^3$ g/mol.

The polyol preferably is essentially linear, more preferably linear, and is a single polyol or a mixture of different substances, in which case the mixture meets the above requirement.

These long-chain compounds are used with a content of 1 mol % equivalent to 80 mol % equivalent, based on the isocyanate group content of the polyisocyanate.

The polyol has the hydroxyl group as reactive group with isocyanate. The polyol is also referred to as polyhydroxy polyol. The polyol (b) preferably is selected from the group consisting of polyesterols, polyetherols or polycarbonate diols, or is a mixture thereof, more preferred is polyether polyol.

In a preferred embodiment 2 comprising all features of embodiment 1 or one of its preferred embodiments the polyol is a diol.

In a preferred embodiment 3 comprising all features of one of the precedent embodiments or one of their preferred embodiments the polyol is a polyether polyol, preferably a polyether diol.

In a preferred embodiment 4 comprising all features of one of the precedent embodiments or one of their preferred embodiments the number average molecular weight of the polyetherpolyol is between $0.6 \times 10^3$ g/Mol and $3 \times 10^3$ g/Mol, more preferably between $0.8 \times 10^3$ g/Mol and $2.5 \times 10^3$ g/Mol, more preferably between $1.3 \times 10^3$ g/Mol and $1.8 \times 10^3$ g/Mol more preferred is $1.4 \times 10^3$ or $1.7 \times 10^3$ g/Mol, more preferably this polyetherpolyol is a polytetrahydrofuran (PTHF).

In a preferred embodiment 5 comprising all features of one of the precedent embodiments or one of their preferred embodiments the number average molecular weight of the polytetrahydrofuran is between $0.6 \times 10^3$ g/Mol and $3 \times 10^3$ g/Mol, more preferably between $0.8 \times 10^3$ g/Mol and $2.5 \times 10^3$ g/Mol, more preferably between $1.3 \times 10^3$ g/Mol and $1.8 \times 10^3$ g/Mol, more preferred is $1.4 \times 10^3$ or $1.7 \times 10^3$ g/Mo.

Polyetherpolyol

In a preferred embodiment 6 comprising all features of one of the precedent embodiments or one of their preferred embodiments the polyether polyol comprises a polyether diol, further preferred based on ethylene oxide, propylene oxide, tetrahydrofuran, butylene oxide, or a mixture thereof. Most preferred the polyether comprises polytetrahydrofuran, more preferably is polytetrahydrofuran.

The number average molecular weight Mn in the context of this invention is preferably determined according to DIN 55672-1.

Preferred polyether polyols include polytetramethylene ether glycol (also referred as PTMEG or PTHF), polypropylene oxide glycol and polybutylene oxide glycol. Particularly preferred is PTMEG or α-hydro-ω-hydroxypoly(oxy tetra-methylene) diol. They are commercially available under the tradename PolyTHF®.

Polyetherpolyol has the advantage that it is more stable against hydrolysis and thus will be applied in applications where this is a requirement.

Chain Extender

According to the invention a chain extender is used in the synthesis of the thermoplastic polyurethane. In a preferred embodiment 7 comprising all features of one of the precedent embodiments or one of their preferred embodiments, the chain extender is an aliphatic, araliphatic, aromatic and/or cycloaliphatic compound, or a mixture thereof, preferably with a molecular weight of $0.05 \times 10^3$ g/mol to $0.499 \times 10^3$ g/mol, preferably with 2 groups reactive with isocyanate, which are also referred to as functional groups. The chain extender is either a single chain extender or a mixture of at least two chain extenders.

The chain extender is preferably a difunctional compound, preferred examples being diamines or alkanediols having 2 to 10 carbon atoms in the alkylene radical, or a mixture thereof.

In a preferred embodiment 8 comprising all features of one of the precedent embodiments or one of their preferred embodiments, the chain extender is selected from the group consisting of 1,2-ethylene glycol, 1,2-propanediol, 1,3-propanediol, 1,4-butanediol, 2,3-butanediol, 1,5-pentanediol, 1,6-hexanediol, diethylene glycol, di-, tri-, tetra-, penta-, hexa-, hepta-, okta-, nona- and/or deca alkylene glycole dipropylene glycol, 1,4-cyclohexanediol, 1,4-dimethanol cyclohexane, neopentylglycol and hydroquinone bis (beta-hydroxyethyl) ether (HQEE), or is a mixture thereof.

More preferably the chain extender is selected from the group consisting of 1,2-ethylene glycol, 1,3-propanediol, 1,4-butanediol, and 1,6-hexanediol, di-, tri-, tetra-, penta-, hexa-, hepta-, okta-, nona- and/or deca alkylene glycole, preferably respective oligo- and/or polypropylene glycole, or is a mixture thereof.

In a preferred embodiment 9 comprising all features of one of the precedent embodiments or one of their preferred embodiments, the chain extender comprises, preferably is 1,3-propanediol, 1,4-butanediol or 1,6-hexanediol, or a mixture thereof.

A preferred mixture of chain extenders is 1,4-butanediol and either 1,6-hexanediol or 1,3-propanediol, wherein, the mol % of 1,4-butanediol preferably is between 80 mol-% and 98 mol-% referring to the whole amount of chain extender being 100 mol-%.

Another preferred mixture of chain extenders is 1,3-propanediol and either 1,6-hexanediol or 1,4-butanediol, wherein, the mol-% of 1,3-propanediol preferably is between 80 mol-% and 98 mol-% referring to the whole amount of chain extender being 100 mol-%.

In a preferred embodiment 10, according to any of the precedent embodiments or one of their preferred embodiments the chain extender comprises, preferably is 1,4-butanediol.

Catalyst

In a preferred embodiment 11 according to any of the precedent embodiments or one of their preferred embodiments a catalyst is used in the synthesis of the thermoplastic polyurethane. Preferred are catalysts which, accelerate the reaction between the NCO groups of the isocyanates (a) and the hydroxyl groups of the compound, which is reactive with isocyanate, in a preferred embodiment also referred to as polyol, and the chain extender. In a preferred embodiment the catalyst is selected from the group consisting of tertiary amine and organic metal compound or is a mixture thereof.

A preferred tertiary amine is selected from the group consisting of triethylamine, dimethylcyclohexylamine, N-methylmorpholine, N,N'-dimethyl-piperazine, 2-(dimethylaminoethoxy)ethanol, diazabicyclo[2.2.octane], or is a mixture thereof.

A preferred organic metal compound is selected from the group consisting of titanic ester, iron compound, tin compound, and bismuth salt, or is a mixture thereof. A preferred iron compound is iron(III) acetylacetonate. A preferred tin compound is selected from the group consisting of tin diacetate, tin dioctoate, tin dilaurate and dialkyl tin salts of aliphatic carboxylic acids, preferably tin dioctoate, or is a mixture thereof. A preferred titanic ester is tetrabutyl orthotitanate. In preferred bismuth salts, the bismuth is present in the oxidation states 2 or 3, in particular 3, with preference being given to salts of carboxylic acids, preferably carboxylic acids having from 6 to 14 carbon atoms, particularly preferably from 8 to 12 carbon atoms. A very preferred bismuth salt is bismuth(III) neodecanoate, bismuth 2-ethylhexanoate, or bismuth octanoate, or is a mixture thereof.

The catalysts are preferably used in an amount of from 0.0001 to 0.1 part by weight per 100 parts by weight of the polyol. Preference is given to using tin catalysts, in particular tin dioctoate.

A very preferred catalyst is SDO (tin (II) 2-ethylhexanoate), preferably used in quantities of 0.35-0.4 parts per weight, referring to the composition.

Polyamid

In a preferred embodiment 12 of the busbar according to one of the precedent embodiments or one of their preferred embodiments the composition comprises a polyamide or a co-polyamide.

A preferred polyamide or a co-polyamide is derived from a diamine and a dicarboxylic acid or from an aminocarboxylic acids or from the corresponding lactams. Preferred polyamides have a melting point below 230° C. Examples for preferred polyamides are polyamide 5,10, polyamide 12, polyamide-11, Other preferred examples are amorph polyamides, preferably the amorph polyamides are the reaction product of 15 weight-% to 84 weight-% of at least one lactam, and 16 weight-% to 85 weight-% of a mixture of monomers (M) comprising the monomer (B) with 16 weight-% to 85 weight-% of a mixture (M) of monomer comprising the two monomers B1 and B2, wherein the monomer B1 is at least one dimeric acid with 32 to 40 carbon atoms (B1) and monomer B2 is at least one diamine 4 to 12 carbon atoms and the weight percentages of the components (A) and (B) are each based on the sum me of the weight percentages of the components (A) and (B).

The most preferred amorph polyamid is polyamid 6/6,36.

The lactam is either a single lactam or is a mixture of at least two lactams, preferred is one lactam. Preferred lactams have 4 to 12 carbon atoms, a very preferred lactam is epsilon-Caprolactam.

Other preferred copolymers are block copolymers of the abovementioned polyamides with polyolefins, with olefin copolymers, with ionomers or with chemically bonded or grafted elastomers;

or with polyethers, e.g. with polyethylene glycol, polypropylene glycol or polytetramethylene glycol, or are mixtures thereof. Other preferred examples are EPDM- or ABS-modified polyamides or copolyamides; and also polyamides, condensed during processing ("IM polyamide systems").

In a preferred embodiment 13 according to one pf the precedent embodiments or one of their preferred embodiments the weight ratio of the thermoplastic polyurethane and the polyamide respectively the co-polyamide in the composition is from 1 to 100 to 100 to 1, preferably 90 to 10, 80 to 20, 70 to 30 or 60 to 40, or any other ration in between.

Auxiliary

In a preferred embodiment 14 according to one of the precedent embodiments or one of their preferred embodiments an auxiliary or additive is added to the structural components. In other words, the additive is comprised in the composition. Preferred examples of auxiliaries include surface-active substances, fillers, flame retardants, nucleating agents, oxidation stabilizers, lubricating and demolding aids, dyes, antistatic agents, and pigments, if necessary, stabilizers, preferably against hydrolysis, light, heat or discoloration, inorganic and/or organic fillers, reinforcing agents and/or plasticizers.

Stabilizers in the sense of this invention are additives which protect a plastic or a plastic composition against harmful environmental influences. Preferred examples are primary and secondary antioxidants, sterically hindered phenols, hindered amine light stabilizers, UV absorbers, hydrolysis inhibitors, quenchers, and flame retardants. Examples of commercial stabilizers are given in Plastics Additives Handbook, 5th Edition, H. Zweifel, ed., Hanser Publishers, Munich, 2001 ([1]), p. 98-S136.

Preferably the UV absorber has a number average molecular weight greater than $0.3 \times 10^3$ g/Mol, in particular greater than $0.39 \times 10^3$ g/Mol. Furthermore, the preferred UV absorber has a molecular weight not exceeding $5 \times 10^3$ g/Mol.

The UV absorber is preferably selected from the group consisting of cinnamates, oxanilides, benzophenones, and benzotriazole, or is a mixture thereof, particularly suitable as UV absorbers is benzotriazole. Examples of particularly suitable UV-absorbers are Tinuvin® 213, Tinuvin® 234, Tinuvin® 312, Tinuvin® 571, Tinuvin® 384 and Eversorb® 82.

Preferably the UV absorbers is added in quantities of 0.01 wt. % to 5 wt. % based on the total weight of the composition, preferably 0.1 wt. % to 2.0 wt. %, in particular 0.2 wt. % to 0.5 wt. %.

Often a UV stabilization based on an antioxidant and a UV absorber as described above is not sufficient to guarantee a good stability of the composition against the harmful influence of UV rays. In this case, in addition to the antioxidant and/or the UV absorber, or as single stabilizer, a hindered-amine light stabilizer (HALS) is be added to the composition.

Examples of commercially available HALS stabilizers can be found in Plastics Additive Handbook, 5th edition, H. Zweifel, Hanser Publishers, Munich, 2001, pp. 123-136.

Particularly preferred hindered amine light stabilizers are bis-(1,2,2,6,6-penta-methylpiperidyl) sebacat (Tinuvin® 765, Ciba Spezialitätenchemie AG) and the condensation product of 1-hydroxyethyl-2,2,6,6-tetramethyl-4-hydroxypiperidine and succinic acid (Tinuvin® 622). In particular, the condensation product of 1-hydroxyethyl-2,2,6,6-tetramethyl-4-hydroxypiperidines and succinic acid (Tinuvin® 622) is preferred, if the titanium content of the finished product is less than 150 ppm, preferably less than 50 ppm, in particular less than 10 ppm, based on the components used.

HALS compounds are preferably used in a concentration of from 0.01 wt. % to 5 wt. %, particularly preferably from 0.1 wt. % to 1 wt. %, in particular from 0.15 wt. % to 0.3 wt. %, based on the total weight of the composition.

A particularly preferred UV stabilization contains a mixture of a phenolic stabilizer, a benzotriazole and a HALS compound in the preferred amounts described above.

Further information on the above-mentioned auxiliaries and additives can be found in the technical literature, e.g. Plastics Additives Handbook, 5th edition, H. Zweifel, ed., Hanser Publishers, Munich, 2001.

e-Modulus

In a preferred embodiment 15 comprising all features of one of the precedent embodiments or one of their preferred embodiments, the e-modulus of the composition determined according to DIN EN ISO 527 is between $0.05 \times 10^3$ MPa and $15 \times 10^3$ MPa, preferably between $0.1 \times 10^3$ MPa and $10 \times 10^3$ MPa, preferably between $0.3 \times 10^3$ MPa and $8 \times 10^3$ MPa, more preferably between $1 \times 10^3$ and $5 \times 10^3$ MPa, even more preferably between $2 \times 10^3$ MPa and $3 \times 10^3$ MPa.

In a preferred embodiment 16 comprising all features of one of the precedent embodiments or on of their preferred embodiments, the Shore hardness of the composition is between 65D and 100D, more preferred between 65 D and 85 D. The Shore D hardness preferably is measured according to DIN ISO 7619-1, 2016.

Fillers:

The composition further comprises a filler. The chemical nature and the shape of the filler can vary within wide ranges if there is sufficient compatibility with the thermoplastic polyurethane.

Preferred fillers are, for example, glass fibers, glass beads, glass microspheres, carbon fibers, aramid fibers, potassium titanate fibers, fibers of liquid-crystalline polymers, organic fibrous fillers or inorganic reinforcing materials. Preferred organic fibrous fillers are, for example, cellulose fibers, hemp fibers, sisal or kenaf. Preferred inorganic reinforcing materials are for example ceramic fillers, or mineral fillers. Preferred ceramic fillers are aluminum and boron nitride. Preferred mineral fillers are asbestos, talc, wollastonite, microvit, silicates, chalk, calcined kaolins, mica and quartz flour, or a mixture thereof.

Fibrous fillers are preferred in the context of the present invention. The fibres preferably have a diameter of 3 µm to 30 µm, preferably 6 µm to 20 µm and especially preferably 8 µm to 15 µm. The fiber length in the compound preferably is 0.02 mm to 1 mm, preferably 0.18 mm to 0.5 mm and especially preferred 0.2 mm to 0.4 mm.

The fibrous fillers preferably are surface pretreated with a silane compound for better compatibility with the thermoplastic polyurethane.

Inorganic fibrous fillers are preferred. When inorganic fibrous fillers are used, a greater reinforcing effect is found as well as a higher heat resistance.

Particularly preferred inorganic fillers for the present invention are glass fibers, glass beads or glass microspheres. In a further preferred embodiment 17 comprising all features of one pf the precedent embodiments, or one of their preferred embodiments, the filler comprises glass, preferably glass fibers, glass beads, or glass microspheres, more preferred glass fiber. The glass preferably is coated. If the glass is a fiber, the thickness of the fiber preferably is from 3 µm to 30 µm, especially 8 µm to 15 µm, and with a maximum of the fiber length distribution in the range of 0.03 mm to about 15 mm, especially 1 mm to 10 mm.

By injection moulding, the fibers get a preferred orientation in the composition, also referred to as flow direction.

The diameter of the glass beads can vary in wide ranges. Suitable and preferred are for example beads having an average diameter in the range of from 5 µm to 100 µm, preferably in the range of from 10 µm to 75 µm, more preferable in the range of from 20 µm to 50 µm, more preferred in a range of from 20 µm to 40 µm.

The diameter of the hollow glass microspheres can vary in wide ranges. Suitable and preferred are for example microspheres having an average diameter in the range of from 5 µm to 100 µm, preferably in the range of from 10 µm to 75 µm, more preferable in the range of from 20 µm to 50 µm, for example in a range of from 20 µm to 40 µm.

Thus, according to a further embodiment 18 according to one of the precedent embodiments or one of their preferred embodiments, the present invention also relates to a busbar with a composition as disclosed above, wherein the microspheres have an average diameter in the range of from 5 µm to 100 µm.

According to the invention, the composition comprises one filler, or more fillers.

In a preferred embodiment 19 according to one of the precedent embodiments or one of their preferred embodiments, the proportion of the filler in the composition is preferably in the range from 5 weight-% to 40 weight-% based on the total composition, preferably 10 weight-% to 30 weight-%, more preferably 10 weight-% to 20 weight-%, more preferred 12 weight-% to 18 weight-%, based on the weight of the total composition being 100 weight %, preferably 30 weight-% to 55 weight-%.

Flame Retardant

The composition of the present invention also comprises at least one flame retardant.

In a preferred embodiment 20 comprising all features of one of the precedent embodiments or one of their preferred embodiments, the filler and the flame retardant comprise 10 weight-% to 60 weight % of the composition, being 100 weight-%, preferably 30 weight-% to 55 weight-%.

In a preferred embodiment 21 comprising all features of one of the precedent embodiments or one of their preferred embodiments, the composition comprises the flame retardant with 3 weight-% to 35 weight-%, preferably 20 weight-% to 35 weight-%, referring to the whole composition, being 100 weight-%, in one preferred embodiment 22 weight % to 28 weight-%.

In a preferred embodiment 22 according to one of the precedent embodiments or one of their preferred embodiments the flame retardant is halogen free.

In a further preferred embodiment 23 according to one of the precedent embodiments or one of their preferred embodiments, the flame retardant comprises nitrogen or phosphor, or a mixture thereof.

A preferred kind of nitrogen containing flame retardant is a nitrogen based compound selected from the group consisting of benzoguanamine, tris(hydroxyethyl)isocyanurate, isocyanurate, allantoin, glycoluril, melamine, melamine cyanurate, melamine polyphosphate, dimelamine phosphate, melamine pyrophosphate, melamine borate, ammonium polyphosphate, melamine ammonium polyphosphate, melamine ammonium pyrophosphate, condensation product of melamine selected from the group consisting of melem, melam, melon and higher condensed compounds and other reaction products of melamine with phosphoric acid, melamine derivatives, or a mixture thereof.

More preferably and in an embodiment 24 according to one of the precedent embodiments or one of their preferred embodiments, the flame retardant is selected from the group consisting of melamine, melamine cyanurate, melamine polyphosphate, di-melamine phosphate, melamine pyrophosphate, melamine borate, ammonium polyphosphate, melamine ammonium polyphosphate, ammonium pyrophosphate, and melamine derivatives, or is a mixture thereof. In another preferred embodiment 25 according to any of the precedent embodiments, or one of their preferred embodiments the composition comprises a flame retardant selected from the group consisting of melamine, melamine cyanurate, melamine borate, melamine polyphosphate and melamine derivatives, or is a mixture thereof. In very preferred embodiment, the flame retardant (B) is melamine cyanurate. Melamine cyanurate is also referred to as 1,3,5-triazine-2, 4,6(1H,3H,5H)-trione.

In a preferred embodiment 26 according to any of the precedent embodiments, or one of their preferred embodiments the composition comprises ammonium polyphosphate as a flame retardant. Preferred such flame retardants are ammonium orthophosphates, preferably $NH_4H_2PO_4$, $(NH_4)_2HPO_4$ or mixtures of these, are ammonium diphosphates, preferably $NH_4H_3P_2O_7$, $(NH_4)_2H_2P_2O_7$, $(NH_4)_3HP_2O_7$, $(NH_4)_4P_2O_7$, or mixtures of these, ammonium polyphosphates, in particular but not exclusively those found in J. Am. Chem. Soc. 91, 62 (1969). The ammonium phosphate component may or may not be coated. Suitable coated ammonium polyphosphates are for example described in U.S. Pat. Nos. 4,347,334, 4,467,056, 4,514,328, and 4,639, 331.

In a preferred embodiment 27 according to any of the precedent embodiments, or one of their preferred embodiments, the flame retardant is an inorganic flame retardant and is preferably selected from the group consisting of magnesium oxide, magnesium hydroxide, silicon oxide, aluminum hydroxide and aluminum oxide, or is a mixture thereof.

In preferred embodiment 28 according to any of the precedent embodiments or one of their preferred embodiments, the flame retardant is a phosphorus containing flame retardant. The phosphorus containing flame retardant preferably is liquid at 21° C.

Preference is given to derivatives of the phosphoric acid, derivatives of the phosphonic acid, or derivatives of the phosphinic acid, or a mixture of two or more of said derivatives.

It is preferable that the derivatives of the phosphoric acid, phosphonic acid, or phosphinic acid involve salts with an organic or an inorganic cation or involve organic esters. In one preferred embodiment, the organic ester involves an alkyl ester, and in another preferred embodiment it involves an aryl ester. It is particularly preferable that all the hydroxy groups of the corresponding phosphorus-containing acid have been esterified.

Organic phosphate esters are preferred, particularly the tri-esters of phosphoric acid, more preferred are the trialkyl phosphates. Other preferred embodiments are triaryl phosphates, especially preferred is tri-phenyl phosphate.

In another embodiment, the phosphoric esters have the general formula (I)

where R denotes substituted alkyl, cycloalkyl, or phenyl groups, and n is a real number in the range of $\geq 1$ to $\leq 15$.

If R in the general formula (I) is an alkyl moiety, alkyl moieties that preferably are used are those having from 1 to 8 carbon atoms. The cyclohexyl moiety may be mentioned as a preferred example of the cycloalkyl groups. It is preferable to use phosphoric esters of the general formula (I) in which R denotes a phenyl or alkyl-substituted phenyl. Preferably, n is 1, or in the range of $\geq 3$ to $\leq 6$. Very preferred phosphoric esters of the general formula (I) are bis(diphenyl) 1,3-phenylenephosphate, bis(dixylenyl) 1,3-phenylenephosphate, and also the corresponding oligomeric products, preferably with an average degree of oligomerization of n in the range of $\geq 3$ to $\leq 6$.

A very preferred phosphoric ester is resorcinol, more preferred resorcinol bis(diphenyl phosphate) (RDP). RDP preferably is present in oligomers.

In a preferred embodiment 29 according to one of the precedent embodiments or one of their preferred embodiments the phosphorus containing flame retardant comprises bisphenol A bis(diphenyl phosphate) (BDP). diphenyl cresyl phosphate (DPC), or a mixture thereof. BPD usually takes the form of an oligomer.

The organic phosphates involve salts with an organic or inorganic cation or involve the esters of phosphonic acid. Preferred esters of phosphonic acid are the diesters of alkyl- or phenylphosphonic acids.

Phosphinic Esters

Other preferred phosphorus contain flame retardants are phosphinic esters having the general formula R1R2(P=O)OR3, wherein the moieties R3 is an organic group, and R1, R2 are organic groups or are hydrogen.

In one preferred embodiment the moieties R1, R2 and R3 are identical, in another preferred embodiment R1, R2 and R3 are different from each other.

R3 preferably is an aliphatic group, or an aromatic group, and preferably has from 1 to 20 carbon atoms, more preferably from 1 to 10. In a preferred embodiment the aliphatic group has from 1 to 3 carbon atoms, more preferably R3 is an ethyl radical or is a methyl radical.

The moieties R1, R2 preferably have from 1 to 20 carbon atoms, more preferably from 1 to 10, It is preferred, that at least one of the moieties R1, R2, or R 3 is an aliphatic and it is more preferred that this aliphatic group has from 1 to 3 carbon atoms. It is more preferable that all of the moieties R1, R2 and R3 are aliphatic groups with the preferences as outlined above.

In one preferred embodiment R1 and R2 are ethyl radical, more preferably in this embodiment R3 is also an ethyl radical or is a methyl radical. In one preferred embodiment, R1, R2 and R3 are simultaneously either an ethyl radical or a methyl radical. In another preferred embodiment R1 and R2 are a hydrogen atom.

Phosphinates

Preference is also given to metal ($M^+$) phosphinate, which is the metal ($M^+$) salt of phosphinic acid with the general formula $M^+[R1R2(P=O)O]^-$. The groups R1 and R2 are either hydrogen, are aliphatic or aromatic, and preferably have from 1 to 20 carbon atoms, preferably from 1 to 10, more preferably from 1 to 3. It is preferable that at least one of the moieties is aliphatic, and it is more preferable that both moieties are aliphatic, and it is very particularly preferable that R1 and R2 are methyl radical or ethyl radical, most preferred ethyl radical.

In a preferred embodiment 30 according to one of the precedent embodiments or one of their preferred embodiments, the flame retardant comprises phosphinate.

In a preferred embodiment 31 according to one of the precedent embodiments or one of their preferred embodiments, the flame retardant comprises a phosphinate selected from the group consisting of aluminum phosphinate, calcium phosphinate, titanium phosphinate, zinc phosphinate, or is a mixture thereof. More preferred comprises aluminum phosphinate.

In other preferred embodiments the R1 or R2 group is a hydrogen atom. and the other group is an organic group with preference as given before. In yet another embodiment the R1 and R2 group is a hydrogen atom.

Preferred salts of phosphinic acids are aluminum, calcium, titanium, or zinc salts, or are mixtures thereof. More preferred is aluminum.

The more preferred metal phosphinate is selected from zinc diethyl phosphinate, aluminum diethyl phosphinate, aluminum phosphinate, calcium phosphinate, or is a mixture thereof. More preferred are is aluminum diethyl phosphinate or is aluminum phosphinate, or a mixture thereof. Most preferred is aluminum diethyl phosphinate.

Preferably, the flame retardant is selected from derivatives of phosphinic acid, salts with organic or inorganic cation or organic esters. Organic esters are derivatives of phosphinic acid in which at least one oxygen atom directly bound to the phosphorus is esterified with an organic residue.

In one preferred form the organic ester is an alkyl ester, in another preferred form an aryl ester. All hydroxy groups of phosphinic acid are particularly preferentially esterified.

Furthermore, piperazine pyrophosphate and polypiperazine pyrophosphate are used as flame retardant in preferred embodiments. The use of piperazine based flame retardants is in principle known from the state of the art, for example as disclosed in WO 2012/174712 A1.

The flame retardant is used in the form of single substance or in mixtures of several substances of either the same kind of flame retardants or different kind of flame retardants in the composition.

In a preferred embodiment 32 according to one of the precedent embodiments or one of their preferred embodiments, the flame retardant comprises a first phosphorus-containing flame retardant (F1) selected from the group consisting of melamine polyphosphate and a further phosphorus-containing flame retardant (F2) selected from the group consisting of derivatives of phosphinic acid as preference is given above, most preferred is aluminum phosphinate.

In preferred embodiment 33 according to one of the precedent embodiments or one of their preferred embodiments, the flame retardant comprises melamine cyanurate [=(1,3,5-triazine-2,4,6(1H,3H,5H)-trione] and phosphoric acid ester, more preferred the phosphoric acid ester resorcinol bis(diphenylphosphate).

The melamine polyphosphate preferably has a phosphorus content between 7 weight % to 20 weight %, preferably in the range from 10 weight % to 17 weight %, more preferably in the range from 12 weight % to 14 weight %.

A further embodiment preferably employs a melamine polyphosphate which in aqueous solution has a pH in the range from 3 to 7, more preferably in the range from 3.5 to 6.5, particularly preferably in the range from 4 to 6, in each case determined according to ISO 976.

It is preferable when the flame retardant (F2) selected from derivatives of phosphinic acid with preferences as given above.

Water Uptake

In a preferred embodiment 34 the water uptake of the composition of the busbar according to one of the precedent embodiments or one of their preferred embodiments is less than 1% measured according to DIN EN ISO 62, Method 1, and is less than 0.5% measured according to DIN EN ISO 62, Method 4.

Glass Temperature

In a preferred embodiment 35 the composition of the busbar according to one of the precedent embodiments, or one of their preferred embodiments passes has a glass temperature $T_g$ of less than −30° C., preferably less than −40° C. and most preferably less than −50° C. The glass temperature $T_g$ preferably is measured with dynamic mechanic analysis, with a torsion frequency of 1 Hz, loss modulus (Max G") [° C.] (DIN 53 019 DIN EN 3219).

UL94

In a preferred embodiment 36 the composition of the busbar according to one of the precedent embodiments, or one of their preferred embodiments passes the UL 94V vertical 2 mm test (ANSI, UL94 "Tests for Flammability of Plastic Materials for Parts in Devices and Appliances" Sixth Edition, Dated Mar. 28, 2013. In a preferred embodiment the busbar fulfills the UL 24 classification V0, V1, V2, more preferred the classification V0 or V1, and especially preferred the classification V0.

Shrinkage

In a preferred embodiment 37 the composition of the busbar of any of the precedent embodiments, or one of their preferred embodiments has a shrinkage of less than 0.8%, preferably less than 0.6%, more preferably less than 0.4%, preferably determined according to ISO 294-4.

CLTE (Coefficient of Linear Thermal Expansion)

In a preferred embodiment 38 of the composition of the busbar according to any of the precedent embodiments, or one of their preferred embodiments the CLTE (Coefficient of Linear Thermal Expansion) of the composition lengthwise to the direction of the fiber is less than $150 \cdot 10^{-6}$ 1/K, preferably less than $80 \cdot 10^{-6}$ 1/K, preferably determined according to ISO 11359-2. In further preferred embodiments 39 the CLTE of the composition of the busbar according to any of the precedent embodiments, or one of their preferred embodiments, if applicable crosswise to fiber direction is less than $150 \cdot 10^{-6}$ 1/K, preferably less than $80 \cdot 10^{-6}$ 1/K, preferably determined according to ISO 11359-2.

Busbar

Busbars are generally uninsulated, self-supporting and have sufficient distance from one another to ensure electrical insulation. The form of the busbar depends on its specific requirements such as installation space, number of plugs to be adapted voltage or flow of electricity. The material of the busbar conductive part of the busbar is metal, preferably selected from the group consisting of aluminum, steel, iron, copper, lead, tin, zinc, or is an alloy thereof. An alloy of lead and tin is a preferred cover of the metal, preferably of the copper.

In a preferred embodiment 40 the busbar according to any of the precedent embodiments or one of their preferred embodiments fulfills the climate change test as outlined in detail in Example 4.

Production Process of the Busbar

Another aspect and preferred embodiment 41 is the production of a busbar according to any of the precedent embodiments or one of their preferred embodiments. The conductive part of the busbar is placed in a mould. In preferred embodiments means for fixing the busbar are positioned together with the conductive part in the mould. In a next step the mould is filled with the composition and after curing of the composition is de-moulded. Preferable the granules of the composition are dried before being used for injection moulding, preferably for at least 3 hours, preferably at about 90° C.

Use

Another aspect of this invention and embodiment 42 is the use of the thermoplastic polyurethane composition as described above for covering a device, preferably an electronic device, more preferably a busbar.

In a preferred embodiment 43 the respective thermoplastic polyurethane composition is in the form of a pellet or a powder. The pellet or powder in a preferred embodiment is a compact material. In another preferred embodiment the pellet is expanded material, also referred to as foamed beads or powder.

| Experiments Example 1: Raw materials | |
|---|---|
| Poly PTHF ® 1000: | Polytetrahydrofuran 1000, CAS-Nummer: 25190-06-1, BASF SE, GERMANY |
| Poly PTHF ® 2000: | Polytetrahydrofuran 2000, CAS-Nummer: 25190-06-1, BASF SE, GERMANY. |
| 1,4-Butandiol: | Butan-1,4-diol, CAS-Nummer: 110-63-4, BASF SE, 67056 Ludwigshafen, GERMANY |
| Lupranat MET: | 4,4'-Methylendiphenyldiisocyanat, CAS-Nummer: 101-68-8, BASF SE, GERMANY |
| Chopvantage HP3550 EC10-3, 8: | Glasfaser von PPG Industries Fiber Glass, Energieweg 3, The Netherlands. E-Glas, diameter of the filament 10 µm, length 3.8 mm. |
| Melapur MC 15 ED: | Melamine cyanurate (1,3,5-triazine-2,4,6(1H,3H,5H)-trione, compound with 1,3,5-triazine-2,4,6-triamine (1:1)), CAS #: 37640-57-6, BASF SE, GERMANY, particle size D99% <1 = 50 µm, D50% <= 4.5 µm, water content % (w/w)<0.2. |
| Fyrolflex RDP: | Resorcinol bis(diphenylphosphate), CAS #: 125997-21-9, Supresta Netherlands B.V., Office Park De Hoef, Hoefseweg 1, 3821 AE Amersfoort, the Netherlands, phosphorous content 10.7%, viscosity at 25° C = 700 mPas, acid number<0.1 mg KOH/g, water content % (w/w) <0.1. |

Example 2: Production of Thermoplastic Polyurethanes A-F

Table 1 below shows the recipes of the thermoplastic polyurethanes (TPU) A to F in which the parts by weight (PW) of the individual starting materials are given. The polyols were placed in a container at 80° C. and mixed with the components according to the amounts given in table 1 under vigorous stirring in a reaction vessel. The isocyanate was added at last component. As soon as a reaction temperature of 110° ° C. was reached or the foam-level exceeded 80% of the reaction vessel volume. The reaction mixture was poured on a heating plate (120)° ° C. forming a slab. The slab was cured on the plate for 10 min, afterwards tempered at 80° ° C. for 15 h, crushed and extruded into granules.

Example 3: Production of the Compositions 1-12

The compositions 1-12 with mixtures of ingredients as indicated in tables 2 and 3 were produced in a ZE 40, which is a twin-screw extruder from Berstorff with a screw length of 35 D, divided into 10 barrel sections (compounding). Granules were obtained using an underwater pelletizing unit of Gala. The granules of the thermoplastic polyurethane used were dried at 90° C. for 3 hours before the compounding.

Example 4: Determination of Properties

The mechanical properties of the thermoplastic polyurethanes (TPU) derived from recipes A to F and of the composition 1-12 were determined on injection molded test bodies. The TPU respectively compositions were dried at 90° C. for 3 hours before injection molding to test bodies and measured with the following specifications. The properties of the test bodies for the individual materials are summarized in tables 1, 2 and 3.

| | |
|---|---|
| density | determined using DIN EN ISO 1183-1 (A) |
| Shore hardness | DIN 53505 |
| tensile strength, elongation at break, and E-modulus | DIN EN ISO 527 |

| | | |
|---|---|---|
| tear strength | DIN ISO 34-1, B (b) | |
| abrasion | DIN 53516 | |
| CLTE-coefficient | ISO 11359-2 | |
| shrinkage | ISO 294-4. | |
| UL94 V | UL 94V vertical 2 mm test (ANSI, UL94 "Tests for Flammability of Plastic Materials for Parts in Devices and Appliances" Sixth Edition, Dated Mar. 28, 2013 | |
| $T_g$ = glass temperature | dynamic mechanic analysis, with a torsion frequency of 1 Hz, loss modulus (Max G") [° C.] (DIN 53 019 DIN EN 3219) | |
| climate change test | 1000 cycles of temperature change: −40° C. during 30 min then 125° C. for another 30 min. The test is passed, when the moulded busbars does not show visible cracking | |

TABLE 1

Properties of the thermoplastic polyurethanes (TPU)A-F

| | TPU | | | | | |
|---|---|---|---|---|---|---|
| | A | B | C | D | E | F |
| IE—inventive example/CE—comparative example | CE | CE | CE | CE | CE | CE |
| Molweight PTHF [Dalton] | 1000 | 1000 | 1000 | 1000 | 1400 | 1700 |
| Poly THF 2000 OHZ: 56.1 [g] | 0 | 0 | 0 | 0 | 19.18 | 28.04 |
| Poly THF 1000 OHZ: 112.2 [g] | 56.00 | 41.33 | 38.84 | 31.38 | 14.38 | 6 |
| Lupranat MET [g] | 35.28 | 45.47 | 47.0 | 52.25 | 49.63 | 49.02 |
| Butandiol, 1.4 [g] | 7.66 | 12.65 | 13.42 | 15.99 | 15.71 | 15.85 |
| Density [g/cm3] | 1.12 | 1.17 | 1.18 | 1.20 | 1.18 | 1.17 |
| Hardness [Shore D] | 36 | 53 | 67 | 75 | 66 | 64 |
| Tensile strength [MPa] | 45 | 50 | 50 | 65 | 50 | 46 |
| Elongation at break [%] | 600 | 450 | 350 | 380 | 310 | 240 |
| Tear strength [kN/m] | 70 | 150 | 190 | 220 | 190 | 175 |
| Abrasion [mm3] | 25 | 30 | 30 | 22 | 60 | 75 |
| $T_g$ (DMA Torsion, 1 Hz, Max G") [° C.] | −43 | −35 | −25 | −7 | −62 | −72 |
| E-modulus at 20° C. [MPa] | 30 | 150 | 250 | 800 | 870 | 900 |
| UL 94V (2 mm) | failed | failed | failed | failed | failed | failed |
| Shrinkage | | | large, 0.6-0.8% | | | |
| Climate change test | passed | passed | passed | passed | passed | passed |
| CLTE (20° C.) | | | 150-200*$10^{-6}$ $K^{-1}$ | | | |

The thermoplastic polyurethanes, derived from the recipes D, E, and F achieved the desired stiffness of above 300 MPa, Shrinkage is high for all materials, none of the thermoplastic polyurethanes, derived from the recipes A to F achieved the required flame retardancy.

TABLE 2

Properties of the compsitions 1-6

| | Composition | | | | | |
|---|---|---|---|---|---|---|
| | 1 | 2 | 3 | 4 | 5 | 6 |
| IE—inventive example/CE—comparative example | CE | CE | CE | CE | CE | CE |
| TPU A | 67.5 | | | | | |
| TPU B | | 67.5 | | | | |
| TPU C | | | 67.5 | | | |
| TPU D | | | | 67.5 | | |
| TPU E | | | | | 67.5 | |
| TPU F | | | | | | 67.5 |
| Melapur MC 15 ED | 25 | 25 | 25 | 25 | 25 | 25 |
| Fyrolflex RDP | 7.5 | 7.5 | 7.5 | 7.5 | 7.5 | 7.5 |
| Density [g/cm3] | 1.23 | 1.27 | 1.27 | 1.29 | 1.27 | 1.27 |
| Hardness [Shore D] | 89 | 58 | 58 | 67 | 63 | 61 |
| Tensile strength [MPa] | 35 | 30 | 24 | 26 | 21 | 22 |
| Elongation at break [%] | 600 | 400 | 283 | 208 | 121 | 260 |
| Tear strength [kN/m] | 60 | 110 | 95 | 128 | 121 | 125 |
| $T_g$ (DMA Torsion, 1 Hz, Max G") [° C.] | −44 | −34 | −26 | −3 | −55 | −65 |

TABLE 2-continued

Properties of the compsitions 1-6

| | Composition | | | | | |
|---|---|---|---|---|---|---|
| | 1 | 2 | 3 | 4 | 5 | 6 |
| E-modulus at 20° C. [MPa] | 60 | 160 | 243 | 526 | 670 | 970 |
| UL 94V (2 mm) | V0 | V0 | V0 | V0 | V0 | V0 |
| Shrinkage | | | | large, 0.5-0.6% | | |
| Climate change test | passed | passed | passed | passed | passed | passed |
| CLTE (20° C.) | | | | 80-120*$10^{-6}$ $K^{-1}$ | | |

Compositions 4-6 had the required stiffness and flame resistance, and also passed the climate change test.

However, compositions 4-6 have a large shrinkage.

TABLE 3

Properties of the composition 7-12

| | Mixtures | | | | | |
|---|---|---|---|---|---|---|
| | 7 | 8 | 9 | 10 | 11 | 12 |
| IE—inventive example/ CE—comparative example | CE | CE | CE | CE | IE | IE |
| TPU A | 52.5 | | | | | |
| TPU B | | 52.5 | | | | |
| TPU C | | | 52.5 | | | |
| TPU D | | | | 52.5 | | |
| TPU E | | | | | 52.5 | |
| TPU F | | | | | | 52.5 |
| Chopvantage HP3550 EC10-3.8 | 15 | 15 | 15 | 15 | 15 | 15 |
| Melapur MC 15 ED | 25 | 25 | 25 | 25 | 25 | 25 |
| Fyrolflex RDP | 7.5 | 7.5 | 7.5 | 7.5 | 7.5 | 7.5 |
| Density [g/cm3] | 1.36 | 1.39 | 1.40 | 1.41 | 1.40 | 1.39 |
| Hardness [Shore D] | 53 | 62 | 66 | 73 | 70 | 67 |
| Tensile strength [MPa] | 30 | 47 | 52 | 62 | 58 | 35 |
| Elongation at break [%] | 24 | 15 | 20 | 13 | 11 | 6 |
| Tear strength [kN/m] | 102 | 151 | 156 | 174 | 165 | 151 |
| $T_g$ (DMA Torsion, 1 Hz, Max G") [° C.] | −42 | −40 | −30 | −25 | −50 | −60 |
| E-modulus at 20° C. [MPa] | 559 | 1430 | 1701 | 2645 | 3010 | 2700 |
| UL 94V (2 mm) | V0 | V0 | V0 | V0 | V0 | V0 |
| Shrinkage | | small, along to flow direction 0.1%-perpendicular to flow direction 0.3% | | | | |
| Climate change test | failed | failed | failed | failed | passed | passed |
| CLTE (20° C.) | | | 30-54*$10^{-6}$ $K^{-1}$ | | | |

In addition to flame retardancy and low shrinkage, all formulations have a sufficiently high modulus of elasticity The climate change test in addition is passed by the formulations according to the invention with recipes comprising Poly THF mixtures with an average molecular weight of $1.4 \times 10^3$ g/mol and $1.7 \times 10^3$ g/mol.

Example 5: Overmoulding of Busbars

For producing the test busbars as outlined in more detail in the Figures, the thermoplastic polyurethane (TPU) respectively the compositions were dried at 90° C. for 3 hours. A standard injection molding machine was used. The molds were mounted on a rail system. A busbar made from copper having a coating made from lead/tin alloy was placed in the injection mold. The injection molding of the thermoplastic polyurethane respectively the composition took place with the following parameters:

Melt temperature [T°] 220° C./230° C.
Temperatures of the cylinder zones (nozzle to funnel): 230° C./220° C./210° C./200° ° C.
Temperature of the mold Wg [T°]: 45° C.
Back pressure: 5 bis 10 bar
Peripheral speed: 0.2 m/s
Injection molding speed: 20 bis 30 mm/s.
Injection time: 0.9 bis 1.5 s
Switching point: 10 mm
Reprint: 80% of the switching pressure
Reprint time: 15 s for 2 mm thickness of the coating
Residual mass cussion: 6 mm
Cooling time: 15 s

The invention claimed is:

1. A busbar at least partly covered with a composition, the composition comprising:
   a thermoplastic polyurethane, a flame retardant, and a filler,
   wherein the thermoplastic polyurethane is a reaction product of a diisocyanate, a polyol, and a chain extender,
   wherein the polyol is a polytetrahydrofuran (PTHF) having a number average molecular weight of from 1300 to 3000 g/mol.

2. The busbar according to claim 1, wherein an e-modulus of the composition determined according to DIN EN ISO 527 is between $0.05 \times 10^3$ MPa and $15 \times 10^3$ MPa.

3. The busbar according to claim 1, wherein the filler is glass.

4. The busbar according to claim 1, wherein the flame retardant is halogen free.

5. The busbar according to claim 1, wherein the flame retardant is a nitrogen-containing flame retardant, a phosphorous-containing flame retardant, or a mixture thereof.

6. The busbar according to claim 1, wherein an e-modulus of the composition determined according to DIN EN ISO 527 is between $0.3 \times 10^3$ MPa and $8 \times 10^3$ MPa.

7. The busbar according to claim 1, wherein the composition has a shrinkage determined under ISO-294-4 of less than 0.4%.

8. The busbar according to claim 1, wherein the filler is glass, and wherein the composition has a shrinkage determined under ISO-294-4 of less than 0.4%.

9. The busbar according to claim 1, wherein the diisocyanate is an aromatic diisocyanate, and wherein the chain extender is butane diol, propane diol, or both.

10. The busbar according to claim 9, wherein the filler is glass, and wherein the flame retardant comprises a nitrogen-containing flame retardant, a phosphorous-containing flame retardant, or a mixture thereof.

11. The busbar according to claim 10, wherein the composition has a shrinkage determined under ISO-294-4 of less than 0.4%.

12. The busbar according to claim 11, wherein the PTHF has a number average molecular weight of from 1400 to 1700 g/mol.

\* \* \* \* \*